United States Patent [19]

Bolle

[11] Patent Number: 5,987,077
[45] Date of Patent: Nov. 16, 1999

[54] METHOD OF SYNCHRONIZING A DIGITAL SIGNAL RECEIVER

[75] Inventor: Michael Bolle, Rethen, Germany

[73] Assignee: Robert Bosch GmbH, Stuttgart, Germany

[21] Appl. No.: 08/983,298

[22] PCT Filed: Jul. 24, 1996

[86] PCT No.: PCT/DE96/01350

§ 371 Date: Jan. 13, 1998

§ 102(e) Date: Jan. 13, 1998

[87] PCT Pub. No.: WO97/19542

PCT Pub. Date: May 29, 1997

[30] Foreign Application Priority Data

Nov. 17, 1995 [DE] Germany .................. 195 42 991

[51] Int. Cl.⁶ .............. H04L 27/06; H04L 7/00; H04J 3/06

[52] U.S. Cl. .................. 375/343; 375/368; 370/514; 370/520

[58] Field of Search ................. 375/368, 343, 375/365, 364, 362, 363; 370/324, 350, 503, 509, 514, 520

[56] References Cited

U.S. PATENT DOCUMENTS 5,245,611  9/1993  Ling et al. ........................ 375/365

Primary Examiner—Stephen Chin
Assistant Examiner—Albert Park
Attorney, Agent, or Firm—Michael J. Striker

[57] ABSTRACT

A method and an arrangement for synchronizing a receiver for digital signals are described. The synchronizing information is derived from the center of distribution of the squared channel impulse response, which center of distribution is calculated directly from the sampling values of the channel frequency response. Thus a separate calculation of the channel impulse response via an inverse Fourier transform from the channel frequency response is unnecessary. The channel frequency response can be determined in a simple way by correlation of a received signal with a reference signal stored in memory in the receiver.

8 Claims, 2 Drawing Sheets

METHOD OF SYNCHRONIZING A DIGITAL SIGNAL RECEIVER

PRIOR ART

The invention is based on a method for precise chronological synchronization of a receiver for digital signals, as generically defined by the preamble to the independent claims. From Published German Patent Application DE 41 28 713 A1, a method is known in which an item of correction information for synchronizing the receiver is derived from the location of a first significant energy component in the channel impulse response. The channel impulse response is ascertained with the aid of an inverse fast Fourier transform (IFFT) from the sampling values of the channel frequency response. An estimate of the channel frequency response can be calculated from the correlation of a received reference signal with a reference signal stored in memory in the receiver. In the known method, the necessary calculations for the inverse Fourier transform and the determination of the correction information from the channel impulse response are performed in a separate signal processor.

ADVANTAGES OF THE INVENTION

The method of the invention has the advantage over the prior art that the correction information for synchronizing the receiver is calculated directly from the sampling values of the channel frequency response, so that the explicit calculation of the channel impulse response via the inverse Fourier transform (IFFT), which is expensive with regard to the computer capacity and memory needed, becomes unnecessary. Thus the separate signal processor for calculating the IFFT and for determining the correction information in the time range, required in receivers of the prior art, also becomes unnecessary.

A further advantage of the method of the invention is considered to be that determining the correction information from the center of distribution of the squared channel impulse response furnishes more accurate results, less vulnerable to perturbation, than determining the location of the first significant energy component in the channel impulse response, since in the method of the invention an average of many values is obtained.

In the dependent claims, advantageous further features of the method of the invention are described. claim 2, for instance, makes it possible to calculate the correction information by a method which is simplified over that disclosed in claim 1 and for which an advantageous device, because it is simply to realize, is described in independent claim 6. In claim 3, a further simplification is disclosed, with recourse to the Cordic algorithm known from the literature.

Further advantageous aspects of the method of the invention, which are described in claims 4 and 5, are obtained by further simplifications. These make it possible to perform the calculations required for determining the correction information with a minimum of expense for circuitry. A device for the method of claim 4 that entails only slight expenditure for circuitry is disclosed in independent claim 7.

DRAWINGS

Exemplary embodiments of the invention are shown in the drawing and described in further detail in the ensuing description.

DESCRIPTION OF THE INVENTION

Figure 1:
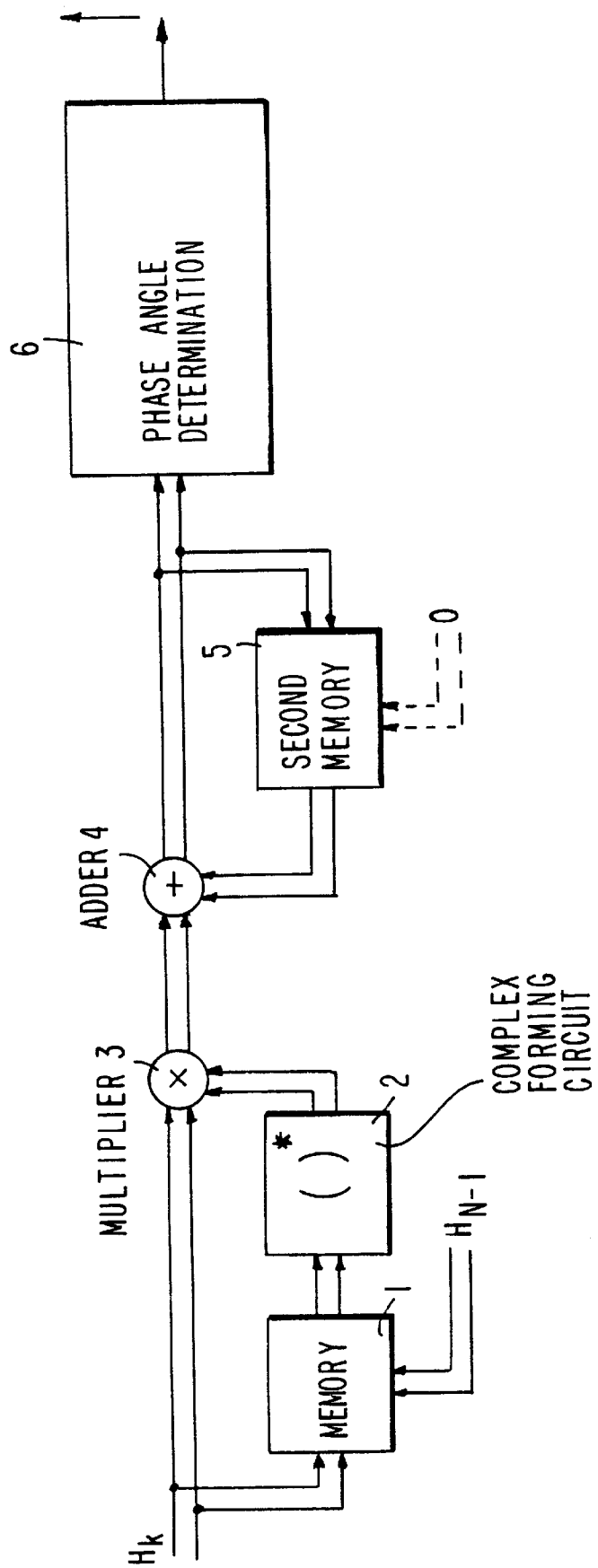
FIG. 1 shows a device for conversion of the method of claim 3.

The present invention has the object of accurate chronological synchronization of a receiver for digital signals, while avoiding the inverse Fourier transform used in receivers of the prior art, which requires intensive computation. For implementing the accurate chronological synchronization in a receiver, the frequency response of the channel on the matrix of the discrete Fourier transform used is ascertained by correlating a received reference symbol with a reference symbol stored in memory in the receiver. An approximation for the center of distribution of the squared channel pulse response can be calculated, with the aid of the relation.

$$\bar{l} = j\frac{N}{2\pi}\sum_{k=0}^{N-1}\frac{H_k(H_k^* - H_{k-1}^*)}{\sum_{k=0}^{N-1}H_kH_k^*} = j\frac{N}{2\pi}\left[1 - \frac{\sum_{k=0}^{N-1}H_kH_{k-1}^*}{\sum_{k=0}^{N-1}H_kH_k^*}\right] \quad (1)$$

from the complex sampling values of the channel frequency response, which here and below will be designated as $H_k$, where $k=0, \ldots, N-1$. N is the length of the fast Fourier transform (FFT) used, and is equivalent to the number of the complex sampling values of the channel frequency response. Because of the approximations used, the value ascertained according to formula (1) is generally complex and must therefore be suitably associated with a real value. This can be done by means of $$\bar{l} = \text{sign}(Re\bar{l})|\bar{l}| \quad (2)$$

The synchronizing information is ascertained with the correct sign. Analyzing the approximations on which equation (1) is based shows that the introduced errors render the desired value $\hat{l}$ in the form of a sine distortion; the error becomes especially great for quantitatively large values ($\hat{l} \gg 1$). The distortions introduced by approximation 2 can be largely undone by means of a nonlinear characteristic curve of the following form $$\hat{l} = \frac{N}{\pi}\arcsin\left(\bar{l}\frac{\pi}{N}\right) \quad (3)$$

in which $\hat{l}$ represents the desired information over the chronological offset, to be compensated for, in the reception window of the receiver. The realization of the nonlinear characteristic curve of equation (3) can be accomplished efficiently by means of a table and by interpolating the values stored in memory in the table.

An improvement to the above method can be obtained by means of the observation that the term $$\frac{\sum_{k=0}^{N-1} H_k H_{k-1}^*}{\sum_{k=0}^{N-1} H_k H_k^*}$$

appearing in equation (1) can be approximated quantitatively for real channels by means of the value 1, so that $$\frac{\sum_{k=0}^{N-1} H_k H_{k-1}^*}{\sum_{k=0}^{N-1} H_k H_k^*} \approx \exp(j\Theta) \quad (4)$$

applies. Thus for an approximation of the center of distribution of the squared channel impulse response, one obtains the following:

$$\hat{l} = \frac{N}{2\pi}\Theta, \quad (5)$$

in which the calculation of the angle $\Theta$ requires merely the calculation of the term $$\Theta = \angle\left(\sum_{k=0}^{N-1} H_k H_{k-1}^*\right) \quad (6)$$

since the nominator term that appears in equation (4) is purely real. Here, $\Theta$ is the phase angle of the sum via the product of the sampling values of the channel frequency response and the conjugated complex value delayed in each case by one clock period. The calculation of the angle can be done using the Cordic algorithm, for which very efficient hardware is also available. In employing this method care must be taken that only the phase of the complex number present at the input of the Cordic component group has to be determined—but not also the quantity, which for the present task is unimportant.

A suitable circuit for determining the correction information $\hat{l}$ by the method described above is shown in FIG. 1. The input to the circuit is connected on the one hand directly to a multiplier 3 and on the other to the second input of the multiplier 3, via a memory 1 that stores the existing value in memory for one clock period and passes it on after the clock period has elapsed and via a circuit unit 2 for forming the conjugated complexes of the input signal. The output of the multiplier 3 is delivered to an adder 4, to whose second input the summation signal is fed back from the output of the adder 4 via a second memory 5. The output of the adder 4 is connected to a circuit unit 6, which serves to determine the phase angle $\Theta$ of the complex summation signal, and at whose output the correction information can be picked up after the necessary calculations have been concluded.

The circuit of FIG. 1 functions as follows. At the onset of the course of events, the two memory elements (1, 5) are initialized with the values $H_{N-1}$ for the first memory element 1 and zero for the second memory element 5. The complex sampling values of the channel frequency response $H_k$, where k=0, . . . , N-1, are delivered to the circuit in succession, one value at a time. In the first memory 1, the values are buffer-stored for one clock period; that is, they are delayed by the duration of one clock period and are then conjugated in the circuit unit 2 by inversion of their imaginary portion. In the multiplier 3, the delayed and conjugated values are multiplied by the values delivered directly to the multiplier 3. The arrangement comprising the adder 4 and the second memory unit 5 accumulates the values $H_k H_{k-1}^*$ formed in the multiplier 3 and after precisely N clock periods furnishes the complex input value $$\sum_{k=0}^{N-1} H_k H_{k-1}^* = x + jy, \quad (7)$$

from which, with the aid of the circuit unit 6, the desired correction information for synchronizing the receiver is derived.

Figure 2:
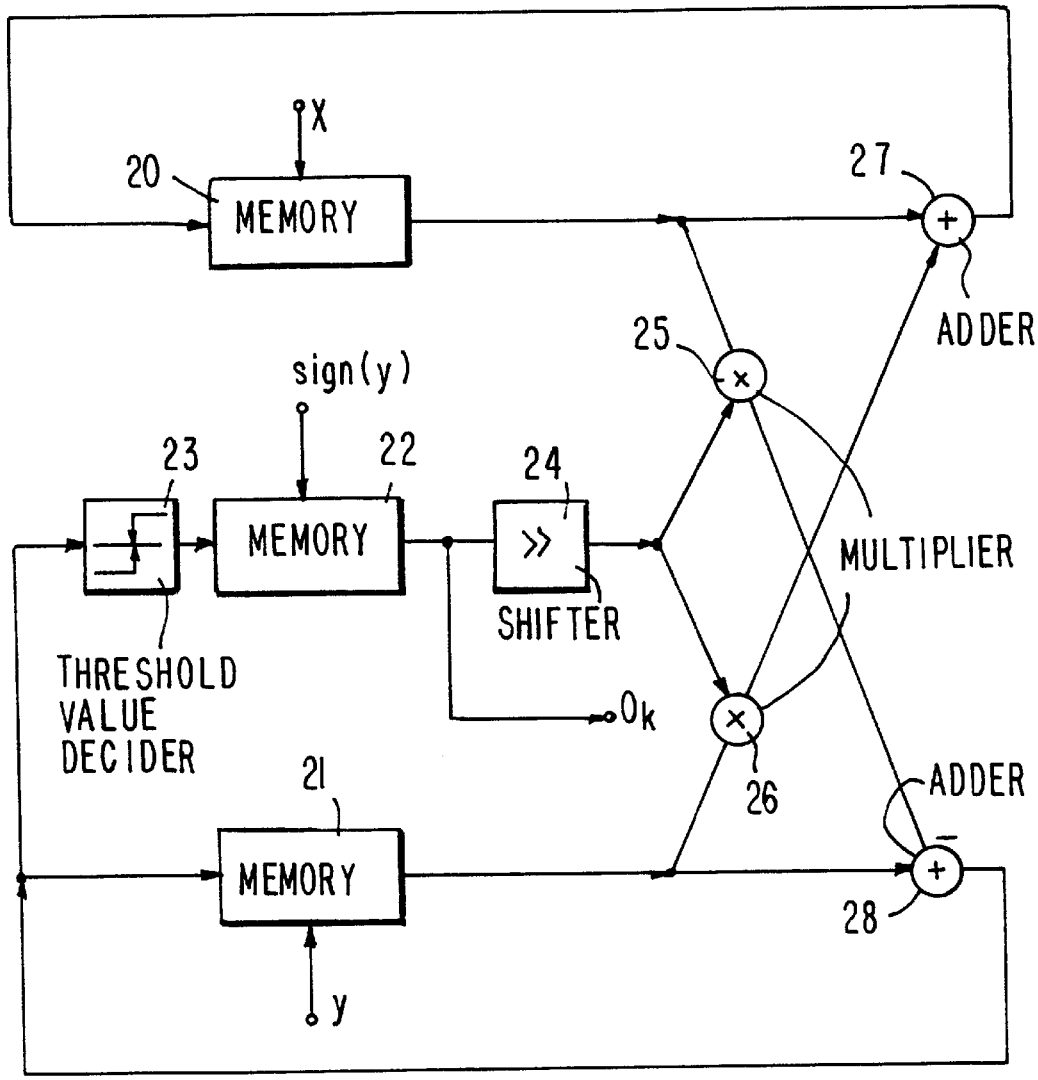
FIG. 2 shows an advantageous embodiment in terms of circuitry for the Cordic algorithm known per se.
Figure 3:
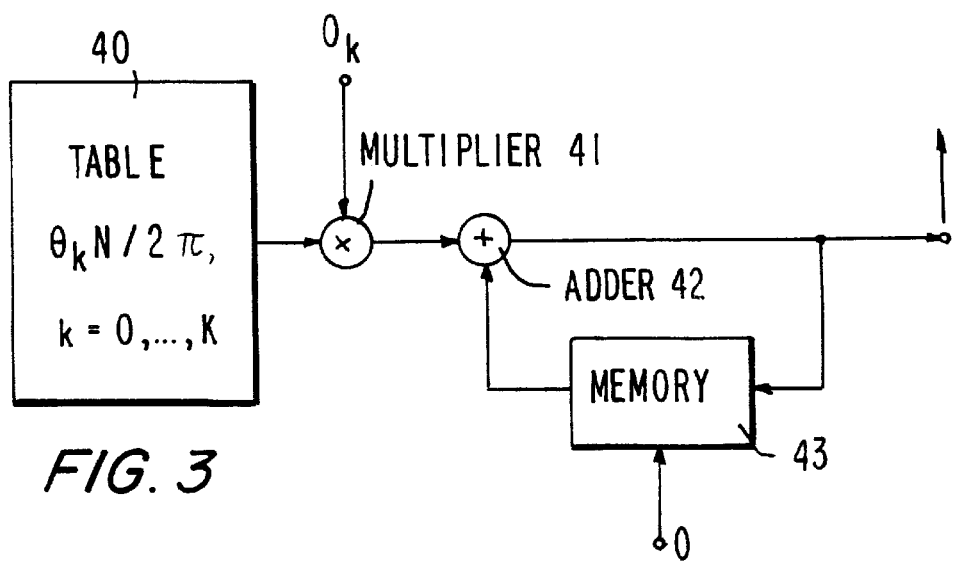
FIG. 3 shows a circuit for converting the values, determined by the Cordic algorithm, into the desired correction information.

The conversion of the complex summation signal at the output of the adder 4 into the desired correction information can advantageously be accomplished using a modified Cordic algorithm, for which a preferred embodiment is shown in FIGS. 2 and 3.

FIG. 2 shows a realization for the actual Cordic algorithm. The output of a third memory element 20 is connected on the one hand to a second multiplier 25 and on the other to a second adder 27, whose second input is connected to the output of a third multiplier 26. The summation signal present at the output of the second adder 27 is fed back to the input of the third memory element 20. Analogously, the output of a fourth memory element 21 is connected on the one hand to a third multiplier 26 and on the other to a third adder 28, whose second input is connected to the output of the second multiplier 25. The summation signal present at the output of the third adder 28 is fed back on the one hand to the input of the fourth memory element 21 and on the other to a threshold value decider 23 for determining the sign of the applied value. The output of the threshold value decider 23 is connected to a fifth memory 22, whose output is connected to a shifter 24 that serves to shift the applied value by a predeterminable number k of places. The shifted signal is delivered to the second inputs of the respective multipliers (25, 26) which in the present case are advantageously embodied as shift registers. The sign sequence $\sigma_k$, representing the phase angle $\Theta$ of the complex summation value applied to the input, can be picked up at the output of the third memory 22.

The initialization of the Cordic circuit of FIG. 2 is done with the complex summation value x+jy, which as described above is made available by the circuit of FIG. 1. The memories (20, 21, 22) are reset to that end at the beginning of the course of events and are initialized with the values x, representing the real portion of the summation value for the third memory 20; y, representing the imaginary portion of the sum for the fourth memory 21; and sign(y), corresponding to the sign of the imaginary portion of the sum for the fifth memory 22. The further functioning of the Cordic algorithm is described in further detail in the following references.

J. P. Volder: "The Cordic trigonometric computing technique", IRE Trans. Electronic Computers, Vol. 8, pp. 330–334, 1959, and J. S. Walther: "A unified algorithm for elementary function", Sprint Joint Computer Conference, pp. 379–385, 1971.

A present number K of iterations of the Cordic algorithm furnishes a sequence of (K+1) sign values $\sigma_k$, where k=0, . . . , K, which can assume the values −1 and 1, and which are a representation of the desired angle $\Theta$ in accordance with $$\Theta \approx \sum_{k=0}^{K} \sigma_k \Theta_k \quad (8)$$

The accuracy of the approximation is determined by the number K of iterations of the circuit of FIG. 2. In a rough estimate, it can be assumed here that the accuracy of the approximation (in bits) is represented by the number K.

The conversion of the sign sequence, obtained by the Cordic algorithm, can be done with the aid of the relation $$\hat{\imath} = \frac{N}{2\pi} \Theta \approx \sum_{k=0}^{K} \frac{N}{2\pi} \Theta_k \sigma_k \quad (9)$$

A suitable circuit for converting the sign sequence $\sigma_k$, K is given in FIG. 3. In a table 40, a sequence $$\frac{N}{2\pi} \Theta_k$$

where k=0, ..., K of elementary angles $\Theta_k$, multiplied by the constant ($N/2\pi$), is stored in memory; the elementary angles $\Theta_k$ are obtained by the relation $$\Theta_k = \begin{cases} \pi/2 & k = 0 \\ \arctan(2^{-k}) & k > 0 \end{cases} \quad (10)$$

The output of table 40 is connected to a fourth multiplier 41, to whose second input the sign sequence $\sigma_k$ determined by the Cordic algorithm can be supplied. The output of the fourth multiplier is connected to the input of a fourth adder 42, to whose second input the summation signal of the fourth adder 42, fed back via a sixth memory 43, is applied. The summation signal, after the conclusion of the iterations, is equivalent to the desired correction signal.

The circuit arrangement of FIG. 3 functions as follows. The table 40 is read out sequentially at discrete times, which are determined by an externally generated clock, and the values $$\frac{N}{2\pi} \Theta_k$$

are evaluated in the fourth multiplier 41 with the appropriate sign $\sigma_k$. The sequence $\sigma_k$ of sign values is calculated using the Cordic algorithm, finally, the weighted table values are added in the fourth adder 42 to the fed-back sum that has been delayed by one clock period in the sixth memory element 43, so that after K clock periods, the sum applied to the output of the adder 42 is equivalent to the desired correction variable.

A simplification of the circuit shown in FIG. 3 can be obtained by means of a further approximation. Here the equation $$\hat{\imath} \approx \frac{N}{2}\left(-1 + \sum_{k=0}^{K} \delta_k 2^{-k}\right) \text{ where } \delta_k = (1+\sigma_k)/2 \quad (11)$$

is used. This approximation is the result of the observation that $$\Theta_k \approx \pi/2^{(k+1)}$$

where $k \geq 0$. Equation (11) can be realized virtually without effort or expense, since essentially it involves a two-complement representation for $\hat{\imath}$, based on the bits $\delta_k$.

I claim:

1. A method for accurate chronological synchronization of a receiver for digital signals, in particular a DAB receiver, in which a correction variable for synchronizing the receiver is derived from the signals received, and the correlation of a transmitted reference signal with a reference signal stored in memory in the receiver is ascertained, characterized in that to determine the correction variable, the center of distribution derived from the received signal of the squared channel impulse response is used;

and that the center of distribution of squared channel impulse response is determined directly from sampling values of the estimate of the channel frequency response obtained by the correlation.

2. The method of claim 1, characterized in that an approximation for the center of distribution of the squared channel impulse response is calculated from the product of a phase angle Θ and a constant ($N/2\pi$), the phase angle Θ being determined from the sampling values of the channel impulse response, and N is the number of sampling values of the channel frequency response.

3. The method of claim 2, characterized in that to determine the phase angle Θ, the Cordic algorithm is used.

4. The method of claim 1, characterized in that an approximation for the center of distribution of the channel impulse response is calculated by adding together elementary angles ($\Theta_k$), which are weighted with sign values ($\delta_k$) and are multiplied by a constant ($N/2\pi$), the sign values ($\delta_k$) being determined successively via the Cordic algorithm.

5. The method of claim 1, characterized in that a further approximation for the center of distribution for the channel impulse response is calculated by adding together sign values ($\Theta_k$) which are weighted with powers of two and are formed by conversion to the values range 0.1 from the signs ($\delta_k$), and by ensuing multiplication by a constant $N/2$.

6. A device for determining a correction information for precise chronological synchronization of a receiver for digital signals, in particular a DAB receiver, comprising a multiplier (3) having an input to which sampling values (Hk) of a channel frequency response can be delivered successively;

a memory element (1) having a series circuit to which the values are delivered;

a circuit (2) for forming conjugated complexes of the input signal, said multiplier (3) having a second input to which the thus-created sequence of conjugated complexes and sampling values, delayed by a clock period, of the channel frequency response are delivered;

an adder (4) to which the sequence of output values of the multiplier (3) is delivered;

a second memory element (5) in which the summations values are delayed by a clock period and from which they are fed back to a second input of the adder (4);

a circuit unit (6) to which the summation values are delivered successively and in which an algorithm for determining a phase angle of the delivered summation value is inplemented, so that an approximation for a center of distribution of a squared channel impulse response appears at an ouput of the circuit unit (6).

7. The device of claim 6, characterised in that the circuit unit (6) is formed so that the Cordic algorithm is implemented in the circuit unit (6) for determining the phase angle of the delivered summation value.

8. The device of claim 7, charaterized in that a fourth multiplier (41) is provided to which elementary angles ($\Theta_k$), stored in a table (40) multiplied by a constant:($N/2\pi$) are delivered successively and weighted with a sign sequence ($\delta_k$) calculated from the sequence of sampling values (Hk) of the channel frequency response;

a fourth adder (42) in which the resultant sequence of values can be added, preceded by one clock period, by feedback of a result of summation via a six memory element (43) to a second input of the fourth adder (42), so that an output signal of the adder, after a conclusion of an iteration after a predeterminable number (K) of clock periods, is an approximation for the center of distribution of the channel impulse response.

* * * * *